Figure 1:
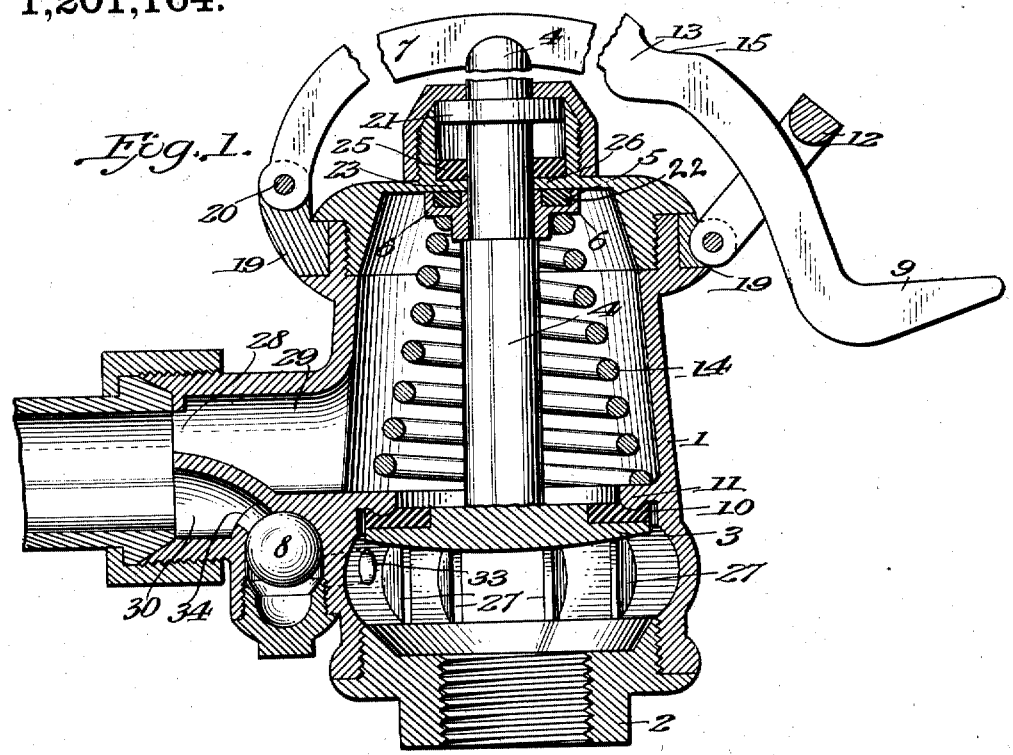

G. J. FERGUSON.
VALVE.
APPLICATION FILED OCT. 25, 1909.

1,201,164.

Patented Oct. 10, 1916.

Inventor:
George Jones Ferguson

UNITED STATES PATENT OFFICE.

GEORGE JONES FERGUSON, OF ST. LOUIS, MISSOURI.

VALVE.

1,201,164.  Specification of Letters Patent.  Patented Oct. 10, 1916.

Application filed October 25, 1909. Serial No. 524,362.

*To all whom it may concern:*

Be it known that I, GEORGE JONES FERGUSON, a subject of the King of Great Britain, residing at St. Louis, State of Missouri, have invented a new and useful Valve, of which the following is a specification.

My invention is particularly designed for service in connection with heating systems; but it is also adapted for general use in which a self-packed, quick opening and closing valve is required.

My valve includes improvements in valves consisting in limiting the valve to two positions, and in which the pressure fluid travels in both directions, or wherein the pressure fluid is stored on the outlet, or inlet side of the valve, or for purposes in which the outlet is always open to the atmosphere, and particularly for purposes wherein a quick opening and closing of the valve is necessary or desirable.

The objects of my invention are to provide a device wherein the movement of the valve is restricted to a full wide open position, and a tight closed position; there being no intermediate station at which the valve can be placed; and having a self-packed stem in both the open and closed positions; a valve that can not be imperfectly closed; and its operation and construction prevents thin leaks of steam that cut, or burn, the valve seats; a valve providing a return by-pass to carry back to the supply pipe all accumulations of water in the radiator from the condensed steam, this usually results from imperfectly closed valves, and frequently causes great damage when such condensation is blown out by way of the vent valve, and this by-pass is closed against steam entering the radiator by the float check valve. The valve is held tightly to its seat by the closing spring and also by the pressure when it travels in the direction to close the valve. The valve is self-closing, and self-packing, by disengaging the locking device that holds it open; and it is opened, or closed instantly by a single movement of the treadle lever either up or down. The valve casing is provided with a large inlet opening in order that a valve of large area can be employed to reduce the traverse of the valve by increasing its area, and that of the inlet opening. The large inlet opening is threaded for a large pipe, and is partly closed by a bushing to fit smaller pipes, in order to reduce the number of sizes of valves required to be kept in stock by dealers; and when my valve is used on radiators I provide the upper outlet passage of reduced size to admit steam, or hot water, and a return lower passage for the water of condensation, or cooled water, this return by-pass being controlled by a floating check valve.

I attain these objects by the mechanism illustrated in the accompanying drawings, in which—

Figure 2:
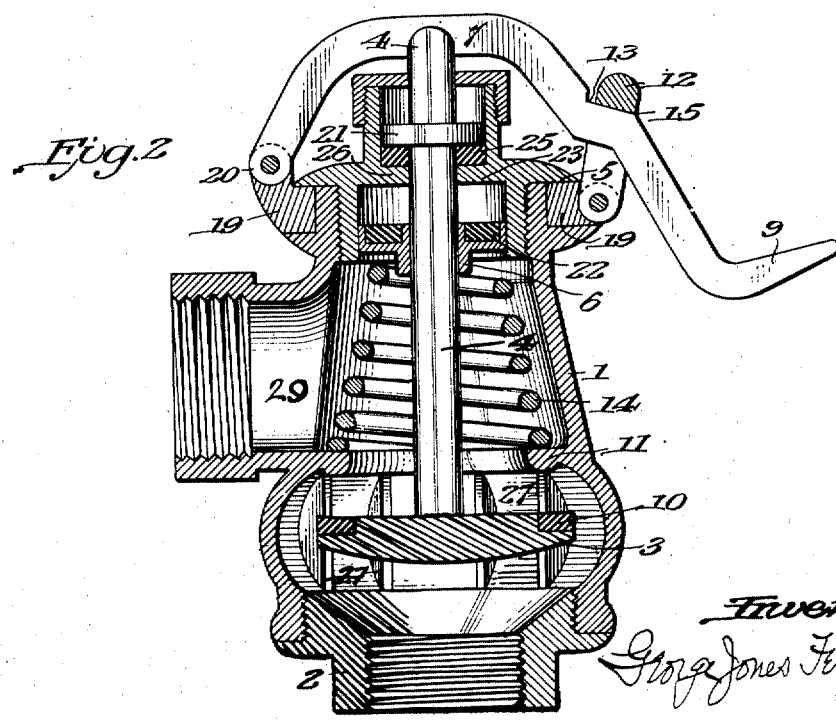

Figure 1, is a view of the valve in vertical section, and in its closed position. Fig. 2, is a vertical sectional view of a slightly modified form and on a slightly reduced scale, in its open position, and adapted for general purposes.

Similar numbered reference characters refer to like parts throughout the specification and drawings.

My valve consists of the casing 1, having the enlarged inlet opening to admit the valve 3, and this inlet opening being screw-threaded to fit the reducing bushing 2; the internal opening in this bushing 2 being made in several different sizes to fit any usual size of pipe in a heating plant, and of course the valve casing will have the thread to fit the largest size of pipe capable of use with the valve; therefore a few sizes of my valve will be capable for all sizes of pipe used in a heating system. This overcomes the difficulty for outlying stores, or country dealers, to keep a full supply of valves, to fit all sizes of pipe.

The sliding valve 3 can be constructed on any of the well known plans, it need not be made integral with the stem 4, as shown, but in any case it will be applied by way of the large inlet opening described above; still for some puposes, as for instance when the pressure fluid travels in the opposite direction, it may then be applied through the opening closed by the cap-nut 5 when it will be opened by an upward movement instead of the downward motion as shown in Figs. 1 and 2. The ribs 27 guide the valve 3, and insure a true seat.

The valve 3, is shown to have an upward projecting stem 4, which passes through and is guided in the cap-nut 5, that closes the top opening in the valve casing 1. The stem 4 is slotted at its apex, or a separate fork may be provided, or any equivalent member suitable to retain and guide the treadle lever 7. The cap-nut 5, as stated, closes the upper opening into the valve casing 1, and also provides a guide for the stem 4, and also forms abutment seats 23 and 26, (these seats may have a round bearing surface as shown at 11, for the valve 3.) Upon the seat 26 is placed the compressible packing abutment 25, adapted to seat the collar 21, attached to the valve stem 4 and secures a self-packed joint when the valve 3 is in its open position, (Fig. 2). The stem 4 is also equipped with the abutment packing seat 6, adapted to retain the compressible abutment packing 22, which engages the seat 23, on the cap-nut 5, in the closed position of the valve 3, and effects a tight joint to retain stored pressure fluid at the outlet end of the valve casing 1, (Fig. 1.).

The valve 3 is shown as being integral with the stem 4, but it can be made detachable, and in any of the many plans in service for many years. In either case it is equipped with the compressible seat 10, which in the closed position, as shown in Fig. 1, rests upon the seat 11, formed on the casing 1. The seat 11, consists of an annular ridge with a rounded bearing surface.

The valve 3, is shown installed to open downward; but the seat 11 may be formed on the upper surface of the valve casing 1, when the valve 3 will open upward.

As previously described the valve 3, and its attached stem 4, are applied through the large inlet opening in the bottom of the valve casing 1, and the valve 3, by means of its stem 4, which is movably connected to the treadle lever 7, is moved down by manual pressure on the treadle lever 7 to its wide open position, as shown in Fig. 2. A passage from the steam supply pipe or other connection secured in the bushing 2, or attached directly into the valve casing 1, permits the fluid pressure to pass into the chamber and passage 29, which may when used as a radiator valve, be reduced to a nozzle at 28, to increase the velocity of the heating medium into the radiator, or other receptacle requiring quick heating. Experiment has proven that the quick heating of a radiator is greatly accelerated by a contracted outlet from the radiator valve, but this nozzle construction requires that a return by-pass 30, be provided having the outlet 34, above the floating check valve 8 made of buoyant material, to return the water of condensation back into the valve casing at 33, below the valve 3. This construction will keep the radiator free of condensation and prevent any discharge of water at the vent valve, by continually draining the radiator. As the weight of the water of condensation will unseat the floating check valve 8 when the steam pressure equalizes in the supply pipe and in the radiator, and also when pressure is absent the water will simply flow back through the return passage 30 and out at 33, but sufficient water will be retained in the cavity under the floating check valve 8, to buoy it up and close the return passage against the entrance of steam. This brings the description to the means employed to actuate the valve 3, whose stem 4 has its apex slotted to slidably retain the treadle lever 7; but a pivoted fork or equivalent member is within the plan of such connection to the valve stem 4. The valve stem 4, and the attached valve 3, is moved down to open said valve 3, the opening being effected by the engagement of the stem 4, with the treadle lever 7, which is jointed at 20 to the swivel ring 19, that surrounds the valve casing 1, and is held in place by flanges on the cap-nut 5, and on the valve casing 1. The treadle lever 7 passes up and over the apex of the valve stem 4, and through the slot therein, or equivalent structure; it then passes down on the opposite side of the valve casing 1, and its lower end is bent into a convenient shape to provide a foot treadle 9, or handle, so that the treadle lever 7, the valve stem 4 and the attached valve 3 can easily be operated by placing a foot upon the treadle and bearing down and depressing the stem 4 and the valve 3, (the stem 4 need not be attached integral to the valve 3, they may be separate parts;) and when the treadle lever 7 is depressed the hook, or clevis 12, which is also hinged at 18 to the swivel ring 19, will tilt onto the inclined surface 15 of the recess 13 in the treadle lever 7, and hold it and the stem 4 and the valve 3 in their wide open position. The purpose of the swivel ring is to enable the foot treadle 9 to be placed in any position for convenience, or to be out of the way.

In every form of my valve the closure is effected by the closing spring 14, which rests upon the valve casing 1 above the valve seat 11, while the upper end of the spring 14 is secured below the collar 6 attached to the stem 4, therefore the spring 14 is compressed by bearing down upon the foot treadle 9, and the release of the foot treadle 9 and of the hook or clevis 12 renders the closure of the valve 3 automatic by the reflex action of the spring 14. The spring 14, may be applied outside of the valve casing 1 above the cap-nut 5, and its upper end placed under the treadle lever 7, or both an inside and outside spring may be used without departing from the scope of my invention.

The necessary improvements secured are the instantaneous opening, or closing of the valve 3, in combination with the self-packing stem. Its conformation and operation unite to render a self-packed stem practical and durable as the valve 3 is restricted to a wide open and tight closed position, and is closed automatically by the spring 14.

A hand lever may be substituted for the treadle lever 7, and in some instances both may be desirable.

The structural form of my valve casing permits the use of a very large valve 3, consequently the opening traverse can be short. This short travel will enable the practical use of an abutting diaphragm packing on the valve stem 4; and I consider that the use of an abutting diaphragm packing as being within the scope of my invention, and as being an equivalent of the abutment packing seats 22 and 25, as described; also the independent return passage 30 for the water of condensation justifies a very short traverse of the valve 3, and enables the use of an abutting diaphragm packing.

The structural form of my valve renders it possible to use many parts of an old style valve in remodeling it into my improved structure. To do this I may revise the old valve body, this will place the present valve seat at the bottom, or under side of the valve casing, the old compression nut can be changed into my cap-nut 5, and the old stem and valve may be remodeled to greatly reduce the cost of reconstruction.

I claim:

1. In a two position valve, a valve casing, and a valve nipple a passage therethrough, a valve in said passage, means to operate said valve, and said operating means having abutment packings adapted to pack the operating means in the open and closed position thereof, to retain active and stored pressure in either position of said valve.

2. In a two position valve, a valve casing, and a valve nipple, a passage therethrough, a valve in said passage, means to open and close said valve, abutment packings on said valve operating means, and said abutment packings adapted to engage the abutment surfaces on the valve casing, to retain active and stored pressure in either position of said valve.

3. In a two position valve, a valve casing, and a valve nipple, a passage therethrough, a valve in said passage, an operating stem attached to said valve, abutment packings on said stem adapted to limit the traverse of said valve, and engage the abutment surfaces on said valve casing, to retain active and stored pressure in either position of said valve.

4. In a two position valve, a valve casing, and a valve nipple, a passage therethrough, a valve to close said passage, a stem on said valve, abutment packings on said stem to engage abutment surfaces formed on the valve casing, to limit the traverse of said abutment packings, and retain active and stored pressure in either position of said valve.

5. In a two position valve, a valve casing, and a valve nipple a passage therethrough, a valve mounted on a stem adapted to close said passage, two compressible abutment packings carried by said stem, and to be seated against the valve casing, one of said packings to seat simultaneously with said valve, the other packing to seat at the full open position of said valve, a spring adapted to close said valve and packing, and a treadle and hook device to hold said valve open.

6. In a two position valve, a valve casing, and a valve nipple, a passage therethrough, a spring closed valve in said passage, a stem operated by a treadle to open said valve, compressible abutment packings on said stem adapted to engage abutments on said valve casing at the open and closed positions of the valve to retain pressure entering at either end of said valve casing.

7. In a two position valve, a valve casing, and a valve nipple a passage therethrough, a spring closed valve in said passage, said valve having a sliding movement, a stem actuated by the treadle to open said valve, a hook engaging said treadle, and holding the valve open by compressing said spring, two compressible abutment packings mounted rigidly on said stem and adapted to engage abutments on said valve casing at the open and closed positions of the valve, to self-pack said stem in both positions and retain pressure moving in either direction.

8. In a two position valve, a valve casing, and a valve nipple, a passage therethrough, a spring closed valve in said passage a sliding stem actuated by the treadle to compress said spring and open said valve, the treadle jointed to said stem and hinged to the swivel ring and said swivel ring carrying a hook device to retain the treadle, two compressible abutment packings on said stem and adapted to engage abutment seats on the valve casing to self-pack said stem in both positions and retain pressure moving in either direction, said valve having a large area and a short traverse, a large inlet opening to admit the valve, and said inlet opening screw threaded to fit a large pipe, and bushed to fit smaller pipes.

9. In a two position valve, a valve casing, and a valve nipple, a passage therethrough, a spring closed valve in said passage, a compressible packing attached to said valve and adapted to engage the inner surface of the cap-nut, to retain active and stored pressure moving in either direction in said passage the treadle to open said valve, the hook to retain the treadle, and said treadle and hook jointed to the swivel ring adapted to be turned in any direction, said valve and passage having a large area, and a large inlet opening in the valve casing to admit the valve, and the large inlet opening screw threaded to fit large pipes, and bushed to fit small pipes.

10. In a two position valve, a valve casing, and a valve nipple, a passage therethrough, a spring closed valve in said passage a compressible packing attached to said valve, said packing engaging opposite surfaces on said valve casing, to retain active and stored pressure moving in either direction in said valve passage, the treadle and stem to open said valve and compress the spring, the hook to hold the treadle, and said treadle and hook jointed to the swivel ring adapted to be turned in any direction, and said valve and passage having a large area, and a large inlet opening in the valve casing to admit the valve, and said large inlet opening screw-threaded to fit large pipes, and bushed to fit small pipes.

11. In a two position valve, a valve casing, a fluid pressure passage reduced to a nozzle and a return passage therein for condensation closed by a check valve, a spring closed valve in said valve casing compressible packings attached to said valve, said packings, engaging opposite surfaces on said valve casing to retain active and stored pressure moving in either direction within said valve casing, the treadle and stem to open said valve and compress the spring, the hook to hold the treadle, and said treadle and hook jointed to the swivel ring, the valve having a large area and short traverse, the valve casing having a large inlet opening to admit the valve, and screw-threaded to fit large pipes.

12. In a two position valve, a valve casing, inlet and outlet openings and a passage connecting said openings in said casing, the spring closed valve controlling said passage, the return by-pass passage, the float check valve controlling said by-pass passage, means to manually operate said spring closed valve, abutting packings on said operating means to retain active and stored pressure in either position of the valve.

GEORGE JONES FERGUSON.

Witnesses:
GEORGE K. FERGUSON,
DORTHEA F. HENSLEY.

It is hereby certified that in Letters Patent No. 1,201,164, granted October 10, 1916, upon the application of George Jones Ferguson, of St. Louis, Missouri, for an improvement in "Valves," errors appear in the printed specification requiring correction as follows: Page 3, line 25, for the word "revise" read *reverse;* page 4, number at head of page, for " 1,120,164 " read *1,201,164;* and that the said Letters Patent should be read with these corrections therein that the same may conform to the record of the case in the Patent Office.

Signed and sealed this 28th day of November, A. D., 1916.

[SEAL.]

F. W. H. CLAY,
*Acting Commissioner of Patents.*

Cl. 137—4.